Nov. 7, 1972   J. W. RICHARDSON   3,702,142
SAFETY VALVE HAVING BACK PRESSURE COMPENSATOR
Filed July 27, 1970   3 Sheets-Sheet 1

INVENTOR
JOHN W. RICHARDSON

ATTORNEY

United States Patent Office 3,702,142
Patented Nov. 7, 1972

3,702,142
SAFETY VALVE HAVING BACK PRESSURE COMPENSATOR
John W. Richardson, Colfax, La., assignor to Dresser Industries, Inc., Dallas, Tex.
Filed July 27, 1970, Ser. No. 59,782
Int. Cl. F16k 17/04
U.S. Cl. 137—472                    14 Claims

ABSTRACT OF THE DISCLOSURE

A safety valve capable of offsettably compensating the adverse operating effects of back pressure associated with valve installation. At full lift, a controlled annular venting about the raised valve disc provides an upward thrust of effective magnitude greater than the downward force being exerted by back pressure. The degree of offset compensation is adjustable to suit operating conditions.

BACKGROUND OF THE INVENTION (1) The field of art to which the invention relates includes the art of "Fluid Handling" as contained in Patent Office Classification 137.

(2) In most conventional installations of steam safety valves, over-pressure is discharged via suitable conduit directly to atmosphere. The topside of the valve disc is normally exposed to atmospheric pressure and use of a sleeve bellows extending axially upward on the backside of the disc has traditionally provided a balance in offsetting superimposed back pressure acting against the disc. However, with the advent of nuclear power plants, it has become necessary to cycle steam and water through portions of the system containing radioactive particles. The hazardous nature of these particles renders their discharge to atmosphere prohibitive as to require an entirely closed system providing for containment of discharge formerly directed to atmosphere. As a consequence of discharging into a closed system, variable back pressure is encountered of magnitudes up to as high as 50 percent of set pressure tending to prematurely close the valve.

According to ASME code, rated lift is required to be maintained at 3 percent accumulation pressure (i.e. rated capacity pressure above set pressure) despite high back pressure encountered. At the same time maintaining set pressure is also required such that the popping point cannot be sacrificed to accommodate the adverse effects of high back pressure. Consequently, it has not been possible to maintain these requirements with bellows type safety valves of conventional design since such valves are inherently incapable of maintaining rated lift when called upon to flow against high back pressure. By way of example, such valve types having a 100 p.s.i.g. set point and 103 p.s.i.g. accumulation pressure function well against an atmospheric discharge. However, on encountering a back pressure, e.g. 10 p.s.i.g. (about 10 percent) and above, the disc moves toward closing and rated lift cannot be maintained. Despite recognition of the problem, it has not been known heretofore how to overcome these difficulties and meet ASME code requirements under the aforementioned back pressure conditions.

SUMMARY

This invention relates to an improvement for safety valves. Specifically, the invention relates to an improvement for safety valves of the balanced bellows type enabling valve performance within ASME code requirements when discharging against high back pressure. In accordance herewith, the effects of high back pressure are completely overcome by a controlled venting feature which effectively provides an upward thrust offsetting the downward forces imposed by the high back pressure. By a presettable adjustment, the offset venting can be set to a desired degree for field conditions to be encountered whereby to completely compensate the effects of back pressure which have plagued performance of safety valves in accordance with the prior art.

It is therefore an object of the invention to provide a novel and improved safety valve.

It is a further object of the invention to provide an improvement for safety valves enabling the valves to maintain rated lift when discharging against high back pressures.

It is a further object of the invention to provide a novel safety valve with improvements as in the aforesaid object enabling the valve to operate within ASME code limits under discharge conditions of high back pressure.

It is a still further object of the invention to provide a novel safety valve of the balanced bellows type having structure to offsettably compensate the adverse effects of high back pressure and which is both simple and yet effective while being adjustable to meet field conditions of back pressure magnitudes to be encountered.

Figure 1:
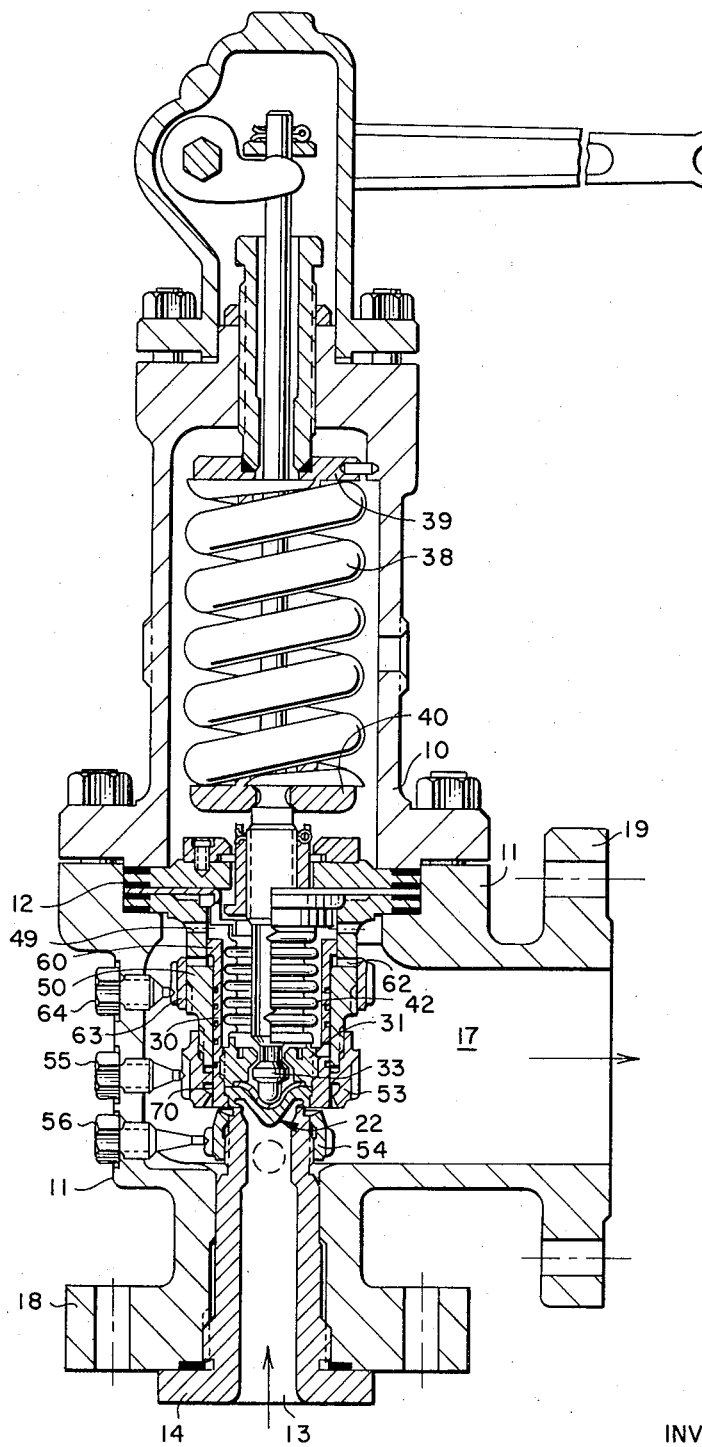
FIG. 1 is a sectional elevation of a balanced bellows safety valve of a type incorporating the inventive improvement hereof.
Figure 2:
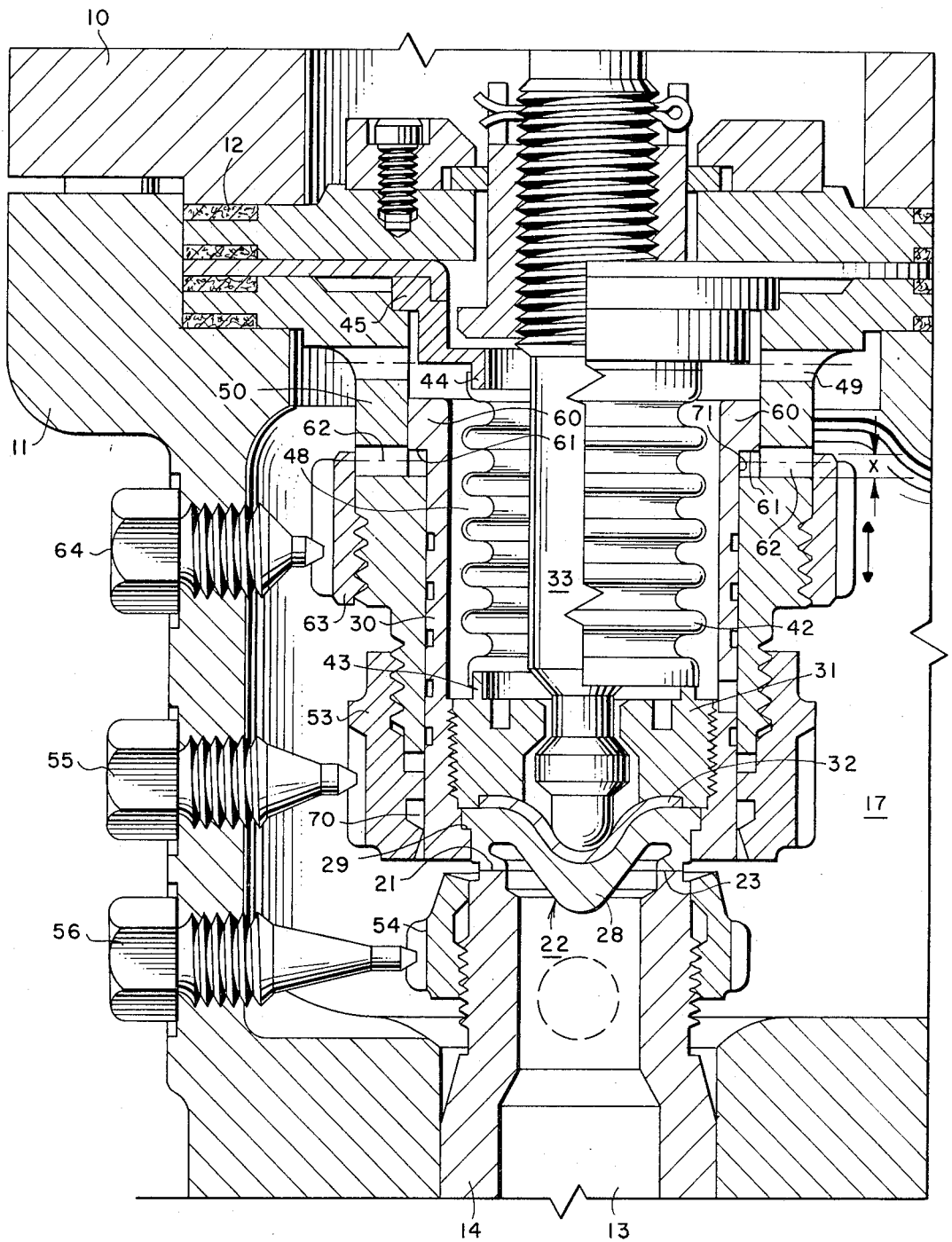
FIG. 2 is an enlarged section about the seating area of FIG. 1 illustrating the valve in its closed relation.

Referring initially to FIGS. 1 and 2 there is illustrated a safety valve of a type in which the invention hereof is incorporated. The valve comprises a bonnet 10 supported on a base 11 with which it is maintained bolted in pressure tight relation via a plurality of intervening gaskets 12. At the underside there is provided an inlet passage 13 defined extending centrally upward within upright inlet nozzle 14 and a flange 18 is provided for connecting the valve to the system pressure against which the valve is to respond. Outlet passage 17 carries system discharge when the valve is open and a flange 19 provides for connection to discharge conduit. For sake of reference it is to be understood in describing the invention that it is usual to install these valves with the inlet axis extending upward in accurate vertical alignment such that terms as "above," "below," "up," "down," "horizontal," "vertical," etc. are to be regarded in this context.

From the lower end of the nozzle, inlet passage 13 extends axially upward to a reduced terminal end section of the nozzle about which is formed an annular horizontally planar extending valve seat 21. Normally engaging the valve seat at system pressures below the set pressure of the valve as to prevent fluid flow therepast is a valve disc generally designated 22 having an annular seat 23 formed at its undersurface generally coextensive with valve seat 21 with which it cooperates when in seating position.

Disc 22 is cylindrical having a lower face section 28 and is secured downwardly seated against a counterbore shoulder 29 beneath collar 31. Collar 31 in turn threadedly secures disc 22. Through a central bore in collar 31 an intervening sealing strip 32 at the underside of the collar receives the enlarged lower end of spindle 33. The spindle extends centrally disposed upwardly into operative relation with a compressed coil spring 38 preloaded between spring washers 39 and 40 as to constantly urge the disc downwardly into tight seating engagement against valve seat 21. A sleeve-like balancing bellows 42 encloses the spindle in a pressure tight relation between a topside collar flange 43 to an underside flange 44 of adapter plate 45. Surrounding the bellows interior of disc-holder 30 is a back pressure chamber 48 which through a plurality of radial ports 49 in coaxial guide member 50 is in constant communication with back pressure in outlet passage 17. An upper adjusting ring 53 and lower adjusting ring 54 can be individually moved to a desired axial location and set via set screws 55 and 56 respectively for varying operating characteristics of the valve in a well known manner.

When fluid pressure acting on the underside of disc 22 exceeds the set force imposed by spring 38, the disc is forceably popped or moved upwardly away from seat 21 to full lift whereby to permit fluid flow past the valve seat to outlet 17 and beyond. At full lift, valve seat 23 is in the relation illustrated in FIG. 3 providing for continuous fluid flow from the inlet to discharge. Concomitant with fluid flow, static pressure existing in passage 17 through ports 49 communicates with chamber 48 and there is instantly provided a downward back pressure force acting against the topside of collar 31 tending to urge the valve away from full lift toward closed position. With minimum back pressures such as when discharging to atmosphere the adverse closing effect is minimal. However, it will be appreciated, that in the absence of the compensating feature of the invention to be described below, when the back pressure force in conjunction with the force of spring 38 effectively exceeds accumulation pressure force, closing of the valve will begin despite need for full lift continuing discharge.

The compensator of the invention by which the adverse effects of back pressure is eliminated or offset to avoid the tendency of premature valve closing will now be described with particular reference to FIGS. 2 and 3. For achieving this result, the uppermost end of disc-holder 30 terminates in a piston like annular flange 60 axially situated in a slidably close fit with the internal circular wall of guide 50 thereat. The radical top face of flange 60 is openly exposed to back pressure in chamber 48 whereas the radial underface 61 thereof is exposed to passage 17 via a plurality of lateral lower ports 62 radially extending through guide 50. An adjusting ring 63 threadedly mounted on the exterior of guide 50 can be axially positioned relative to ports 62 and secured thereat via set screw 64 to effect a partial port closing by overlying the port openings a desired distance designated X. As can be seen in the drawings, advancing the adjusting ring upward increases the closure segment to decrease port flow area whereas advancing it downward decreases the closure segment to increase port flow area. It will be noted that the closing and opening effect of any predetermined axial dimension X will vary as a function of the number and diameter of ports 62 angularly displaced and extending radially through guide 50. In a preferred embodiment, four ports 62 on 90 degree centers and of about ¼ inch diameter have been highly suitable.

Figure 3:
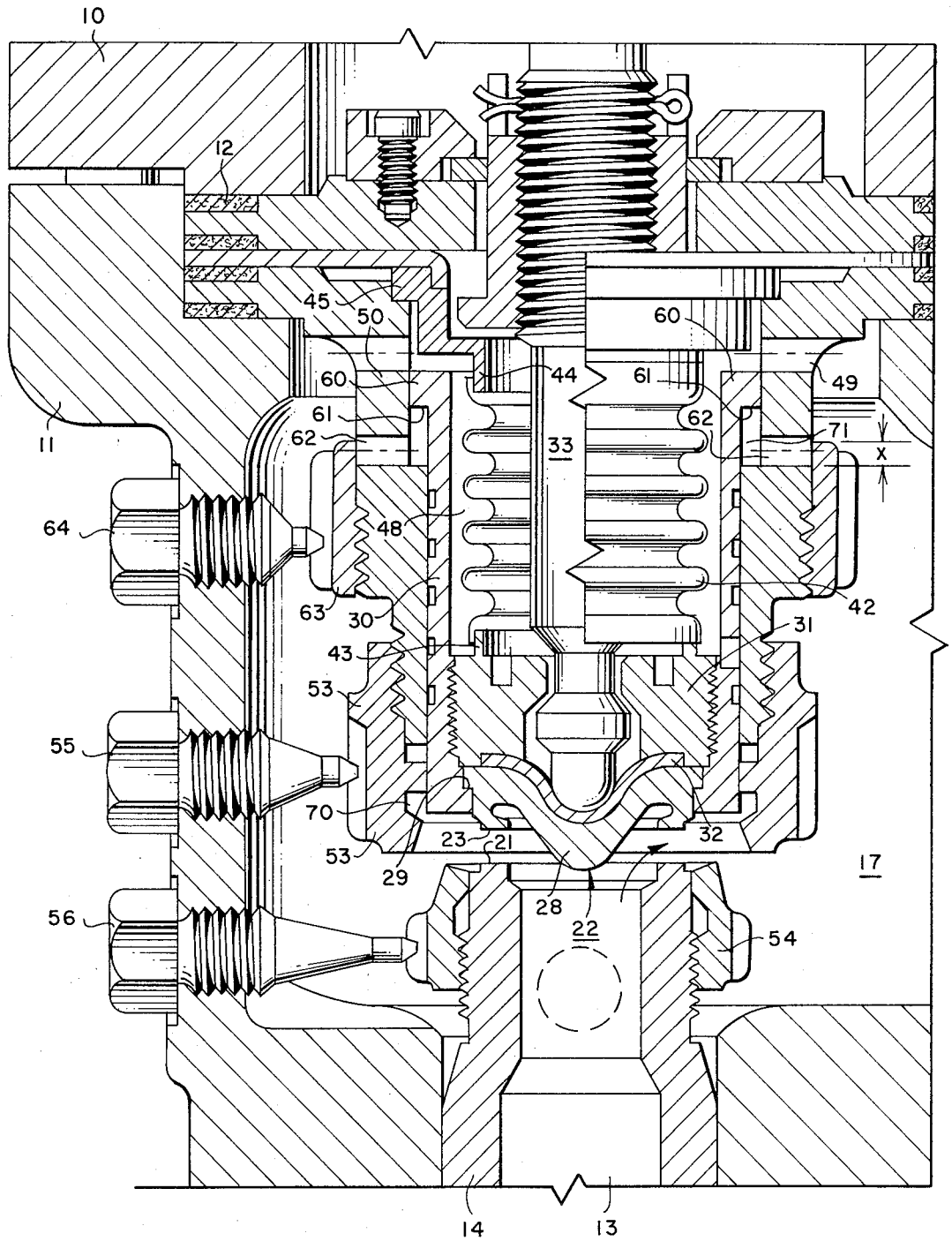
FIG. 3 is a view similar to FIG. 2 but illustrating the valve in its open full lift discharge relation.

The operating effect of piston 60, ports 62, and ring 63 become available when the valve reaches full lift position in the manner illustrated in FIG. 3. In this relation upward movement of disc-holder 30 and disc 22 exposes an annular reaction chamber 70 adjacent the disc and against which fluid flow impinges when passing from inlet 13 to outlet 17. Fluid impingement thereat produces a reaction of high pressure which via a slide clearance (not shown) between the exterior of holder 30 and the interior of guide 50 is communicated to an annular space 71. Space 71, as can be seen, is immediately below piston face 61 and opens into radial ports 62.

The magnitude of pressure available in space 71 is governed by the X position of adjusting ring 63 producing a pressure drop relative to chamber 48, the pressure differential of which acts upward against piston face 61. In this manner, should a downward force against the valve disc exist by virtue of static back pressure in chamber 48, it is offset by the upward thrust produced against piston 60. The net upward force differential is the product of the pressure differential between chambers 71 and 48 multiplied by the surface area of piston face 61. By presetting the upward thrust to meet field conditions of the installation in which the valve is to be employed a force balance can be achieved in favor of maintaining full lift at accumulation pressure. When overpressure has been relieved, the valve disc 22 will then move toward closed position in the normal pattern. On holder 33 moving downward past chamber 70, the chamber closes and the upward reaction flow will essentially terminate. Thereafter the upward force imposed on the piston face ceases being dissipated through ports 62 and permitting the disc to continue downward until positioned against valve seat 21.

In operation, the valve remains closed to fluid flow until an overpressure condition existing in inlet 13 overcomes the spring force acting downward against disc 22. When an overpressure condition occurs, fluid pressure acting over the entire face of the disc and holder forces the disc and holder in a popping action upward to full lift position. On reaching full lift, the initiated fluid flow moving toward outlet 17 produces a reaction force in newly exposed annular chamber 70 and which force is communicated to chamber 71 via the slide clearance between holder 30 and guide 50. When the latter situation occurs, the upward forces acting against piston 60 at least slightly exceed the downwardly acting forces imposed by back pressure in chamber 48. The net upward force produced as a result of the pressure differential between chambers 71 and 48 multiplied by the surface area of piston face 61 can be readily adjusted by an axial setting of adjustment ring 63 to close radial ports 62 a dimension X as required.

By the above description there has been disclosed a novel improvement for a safety valve to overcome the adverse effects of high back pressure associated with valve discharge in an installation with which the valve is to be operative. The compensator hereof is extremely effective in resolving a difficulty which has previously plagued the industry yet is relatively simple in construction. Moreover, the compensation feature affords the versatility of adjustment against variable back pressures so as to accommodate specific field conditions to be encountered. By virtue of the simple improvement afforded hereby, requirements of the ASME code can be readily attained without difficulty in a manner unable to be attained by such valves in the prior art.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a safety valve including a body defining a fluid passage between an inlet and outlet, an annular seat surrounding said passage at an intermediate location thereof, a disc movable in response to overpressure at said inlet from between an urged first position engaging said seat to prevent fluid therepast toward a full lift second position removed from said seat to permit fluid flow from said inlet to said outlet and means defining a first chamber overlying said disc and in communication with pressure at said outlet, the combination therewith of a back pressure compensator effective at a predetermined accumulation pressure for offsetting back pressure force in said first chamber urging movement of said disc from said second toward said first position, said compensator comprising means defining a second chamber operably separated from said first chamber and operative to exert a net positive force opposing said back pressure force when the back pressure in said first chamber is of magnitude of about at least ten percent of the set pressure of the valve.

2. In a safety valve according to claim 1 in which said compensator includes means to adjust the magnitude of back pressure against which it can effectively operate.

3. In a safety valve according to claim 1 in which said compensator comprises a piston connected to said disc for conjoint movement therewith and there is provided means operative with said disc in said second position to communicate pressure from said inlet to the operative face of said piston for urging said disc in a direction opposed to the force direction effected by back pressure in said first chamber.

4. In a safety valve according to claim 3 in which said compensator includes means to adjust the magnitude of back pressure against which it can effectively operate.

5. In a safety valve according to claim 4 in which said adjustment means comprises means defining at least one opening communicating the operative face of said piston with the pressure at said outlet and a closure member to control the effective flow area of said opening.

6. In a safety valve according to claim 5 in which said opening extends radially to the axis of said disc and said closure member is movable axially parallel with said disc axis to a position partially across said opening.

7. In a safety valve according to claim 6 in which said at least one opening comprises a plurality of openings and said closure comprises an annular ring which can be threadedly advanced to a predetermined segmental location across said openings.

8. In a balanced bellows safety valve including a body defining a fluid passage between an inlet and an outlet, an annular seat surrounding said passage at an intermediate location thereof, a disc movable in response to overpressure at said inlet from between an urged first position engaging said seat to prevent fluid therepast toward a full lift second position removed from said seat to permit fluid flow from said inlet to said outlet, a disc holder for supporting said disc in movement between said positions and extending away therefrom to define a first chamber overlying said disc openly communicating with pressure at said outlet, and a balancing bellows interior of said chamber secured pressure tight to a central portion of said disc, the combination therewith of a back pressure compensator effective at a predetermined accumulation pressure for offsetting back pressure force in said first chamber urging movement of said disc from said second toward said first position, said compensator comprising means defining a second chamber operably separated from said first chamber and operative to exert a net positive force opposing said back pressure force when the back pressure in said first chamber is of magnitude of about at least ten percent of the set pressure of the valve.

9. In a safety valve according to claim 8 in which said compensator includes means to adjust the magnitude of back pressure against which it can effectively operate.

10. In a safety valve according to claim 8 in which said compensator comprises a piston connected to said disc for conjoint movement therewith and there is provided a passage with said disc in said second position to communicate pressure from said inlet to the operative face of said piston for urging said disc in a direction opposed to the force direction effected by back pressure in said first chamber.

11. In a safety valve according to claim 10 in which said compensator includes means to adjust the magnitude of back pressure against which it can effectively operate.

12. In a safety valve according to claim 11 in which said adjustment means comprises means defining at least one opening communicating the operative face of said piston with the pressure at said outlet and a closure member to control the effective flow area of said opening.

13. In a safety valve according to claim 12 in which said opening extends radially to the axis of said disc and said closure member is movable axially parallel with said disc axis to a position partially across said opening.

14. In a safety valve according to claim 13 in which said at least one opening comprises a plurality of openings and said closure member comprises an annular ring which can be threadedly advanced to a predetermined segmental location across said openings.

References Cited
UNITED STATES PATENTS

| | | | |
|---|---|---|---|
| 2,878,828 | 3/1959 | Klatfstad | 137—478 |
| 2,754,842 | 7/1956 | Hagiwara | 137—478 X |
| 2,880,751 | 4/1959 | Tobis | 137—478 |
| 2,165,611 | 7/1939 | Campbell | 137—472 X |
| 2,597,057 | 5/1952 | Bergquist | 137—478 X |

HAROLD W. WEAKLEY, Primary Examiner

U.S. Cl. X.R.

137—478